United States Patent [19]
Takahashi et al.

[11] 3,934,429
[45] Jan. 27, 1976

[54] CONSTANT VELOCITY UNIVERSAL JOINT

[75] Inventors: Koichi Takahashi, Yokohama; Nobuteru Hitomi, Yokosuka; Taisuke Kizu, Fujisawa, all of Japan

[73] Assignee: Nissan Motor Company Limited, Yokohama, Japan

[22] Filed: June 5, 1974

[21] Appl. No.: 476,703

[30] Foreign Application Priority Data
June 30, 1973 Japan.............................. 48-73853

[52] U.S. Cl............................................ 64/21; 64/8
[51] Int. Cl.² ............................................ F16D 3/30
[58] Field of Search................................. 64/21, 8, 7

[56] References Cited
UNITED STATES PATENTS

| | | | |
|---|---|---|---|
| 3,442,095 | 5/1969 | Devos | 64/21 |
| 3,520,152 | 7/1970 | Schmid | 64/21 |
| 3,557,572 | 1/1971 | Aucktor et al. | 64/21 |
| 3,789,626 | 2/1974 | Girguis | 64/8 |

*Primary Examiner*—Samuel Scott
*Assistant Examiner*—Randall Heald

[57] ABSTRACT

A cage having spherical inner and outer surfaces with their respective center points of curvature offset from joint center point to the opposite sides of same.

3 Claims, 11 Drawing Figures

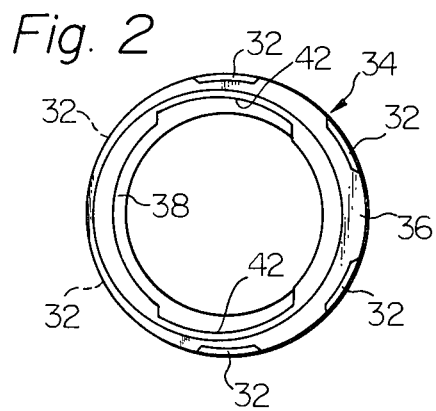
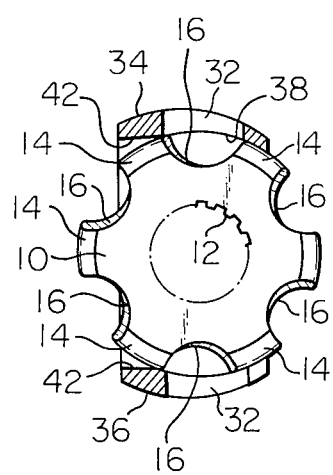
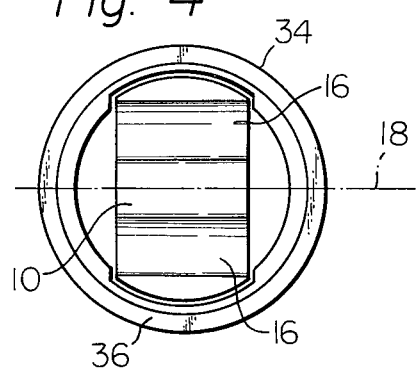
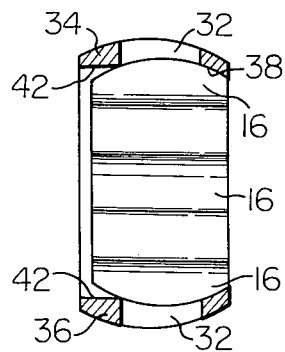
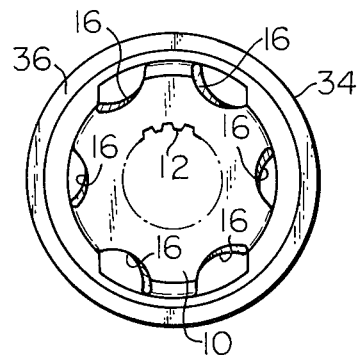

CONSTANT VELOCITY UNIVERSAL JOINT

The present invention relates to a constant velocity universal joint which utilizes a plurality of annularly arranged spaced balls mounted between outer and inner races and maintained in operating position by a retainer or cage through which torque is transmitted between the driver and follower.

The mechanical construction is such that the balls disposed between inner and outer races, transmitting the motion from the driver to the follower, always lie in a common plane bisecting the angle between the center axes of the driver and the follower, thus providing the velocity ratio of unity in this type of joint. In attempts to improve the application and transmission of forces between the outer and inner races and minimize the tendency of the balls to become off-set from the bisecting plane, several of the well known constant velocity joints of the foregoing type have accurate ball receiving grooves in the inner and outer races and/or grooves in the outer race intersecting the grooves of the inner race when the axes of the two races are parallel. Therefore, the ball location depends only on the disposition of the center lines of both grooves. The production of races with grooves of these types normally involves difficult and time consuming machining operations, and close tolerances are necessary in order to obtain satisfactory performance.

In other attempts to simplify machining operations in the production of races, another well known constant velocity joint has straight ball receiving grooves in the inner and outer races which are parallel and opposite to the grooves in the inner race when the axes of the two races are parallel. Although production of these grooves is easy, the tendency for the balls to become off-set increases when torque is transmitted from the driver to the follower through a relatively large angle, because a ball is located by grooves in the inner and outer races on the common plane of two axes and the ability of location is lower than three dimensional location. The angular movement of this joint is restricted to a limited range because of the short length of the ball retaining grooves.

In one prior universal joint well known in the art an annular ball retaining cage is used. The ball retaining cage has an outer spherical surface and an inner spherical surface having the center point of curvature common to that of the outer spherical surface. Outer and inner races have spherical inner and outer surfaces, respectively, mating to the outer and the inner spherical surfaces of the ball retaining cage. The inner spherical surface of the outer race and the outer spherical surface of the inner race should have a center of curvature common to that of the ball retaining cage. The production of ball retaining cage, inner and outer races of this two dimensional location type normally involve difficult and time consuming machining operations, and close tolerances are required in order to obtain satisfactory performance. In case of the present invention, the ball location depends on the disposition of grooves and the off-set cage. Therefore, it is easy to fabricate a joint. Since the inner race has to be dimensioned to be assembled into the ball retaining cage, it is impossible to have the width of the inner race satisfactorily long. Thus the length of each of the ball retaining grooves which would be formed in the outer spherical surface of the inner race cannot be made long enough to enable the universal joint to transmit a torque through a relatively high degree of angular movement.

It is therefore one object of the present invention to provide a constant velocity universal joint which is simple and compact in construction, using three dimensional ball-engaging grooves each of which has the center line inclined at a small angle with respect to a hypothetical plane including the axis of the inner race, in case of a groove formed in the inner race, and the axis of the outer race, in case of a groove formed in the outer race, and hence economical production is possible, using standard machine tools and simple machining practices.

Another object of the present invention to provide a constant velocity universal joint which has a relatively high degree of angular movement without affecting the optimum operation of the joint.

A further object of the present invention is to provide a constant velocity universal joint which has a relatively high degree of rigidity, as compared to prior art constant velocity universal joint of the same dimensions.

A still another object of the present invention is to provide a constant velocity universal joint for use in a power transmitting line of an automobile.

The other objects, features and advantages of the present invention will become apparent from the following description in connection with the accompanying drawings, in which:

FIG. 2 is an axial view of a ball-retaining cage used in the joint shown in FIG. 1;

FIg. 3 is a partial cross sectional view showing an inner race and the cage;

FIG. 4 is an axial view of FIG. 3;

FIg. 5 is a similar view to FIG. 3 showing the inner race in the operative position;

FIG. 6 is an axial view of FIG. 5;

Figure 1:
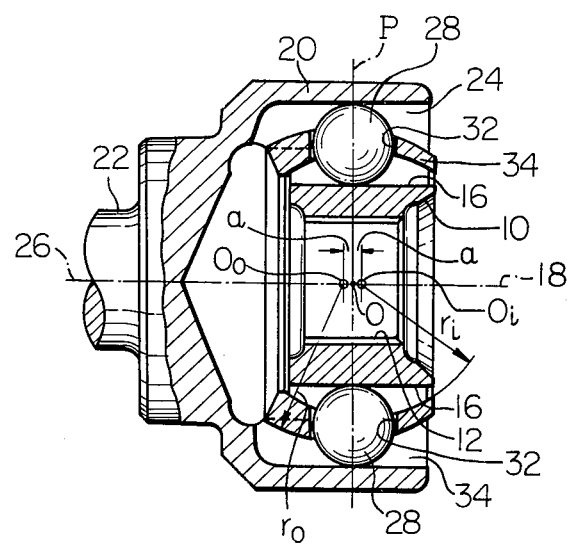
FIG. 1 is a longitudinal cross sectional view of a constant velocity universal joint embodying the present invention.
Figure 7:
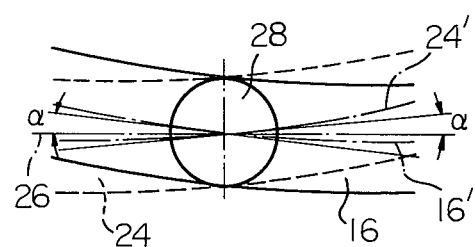
FIG. 7 is a schematic illustration of two intersecting ball-engaging grooves with a power transmitting ball located at the intersection of the two grooves.

Referring to the accompanying drawings and particularly to FIGS. 1 to 7 thereof, there is shown a constant velocity universal joint according to the present invention having an inner race 10 which may be splined by splines 12 onto a shaft (not shown). In the external peripheral surface 14 of the inner race 10, six ball-engaging grooves 16 are machined, each having a center line 16' forming an angle with respect to a an axis 18 of the inner race 10. In FIG. 1, the grooves 16 are shown projected into the plane of the drawing for the sake of simplicity. In FIG. 7 the grooves are shown as angled with respect to the inner race axis 18.

The inner race 10 is surrounded by an outer race 20 concentrically connected to a second shaft 22 by suitable means. The outer race 20 is formed with grooves 24 on the inner surface 25, each groove having a center line 24' forming an angle $\alpha$ with respect to an axis 26 of the outer race 20, as illustrated diagrammatically in FIG. 7, but in a direction opposite to the angle of the center line 16' of the groove 16 disposed opposite thereto in the inner race 10. The groove 24 in FIG. 1 has also been projected onto the plane of the drawing for the sake of simplicity.

At the intersection of each cooperating pair of grooves 16 and 24 is a ball 28 which, by cooperation with the grooves 16 and 24 transmits torque between the inner race 10 and the outer race 20. All of the balls 28 (only two being shown in FIG. 1) are respectively located in apertures 32 of a cage 34, which keeps all the balls 28 disposed in the bisecting plane or one plane P, extending substantially perpendicularly to the plane of the drawing in FIG. 1.

To enable that the inner race 10 to be angularly displaceable relative to the outer race 20 without substantial end motion, both the inner surface 25 of the outer race 20 and the mating outer surface 36 of the cage 34 are spherical and have substantially the same radius Ro and a common center of curvature Oo lying on the axis 26 of the outer race 20. The inner surface 38 of the cage 34 and the mating outer surface 14 of the inner race 10 are spherical and have a shorter radius Ri than that of the spherical outer surface of the cage 34 and a common center of curvature Oi lying on the axis 18 of the inner race 10. The center of radius Oo and the center of radius Oi are equidistant by a distance a from the center point O of the joint which is located at the common intersection of axes 18 and 26 and a ball plane P in which the balls 28 are always maintained.

Figure 8:
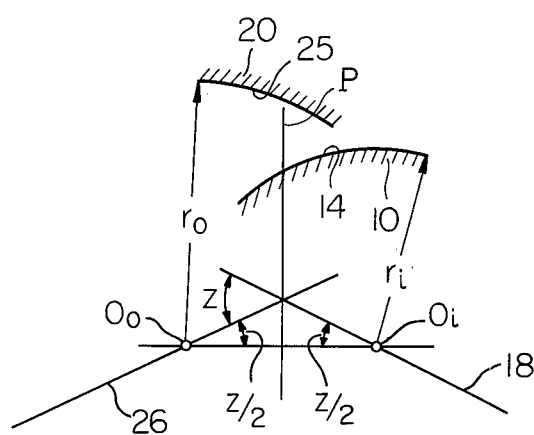
FIGS. 8 and 9 are diagrammatic illustrations showing the angular relationship of the universal joint components for achieving constant velocity.
Figure 9:
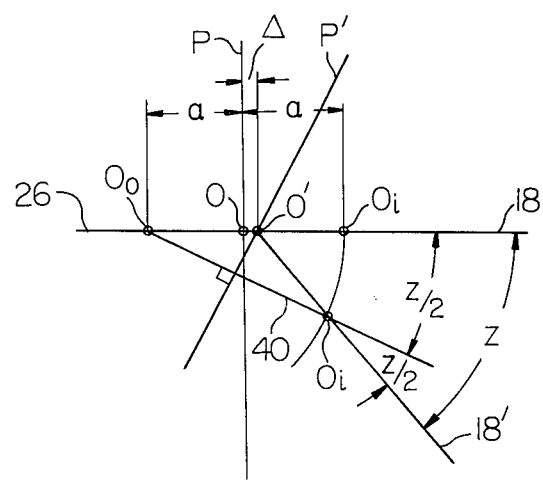

The cage 34, as illustrated in FIG. 1, has on the inner edge thereof adjacent to the shaft 22 a greater thickness than on the outer edge thereof remote from the shaft 22. In another case, the thicker portion is able to dispose opposite side. Notwithstanding, in the universal joint of the present invention, the center point Oo of curvature of the spherical inner surface 25 of the outer race 20 and that Oi of the spherical outer surface 14 of the inner race 10 are equidistant by $a$ from the center point of the joint O, all the balls 28 are maintained on the circumference of the bisector plane P. FIG. 8 shows diagrammatically the condition of the joint of the invention when the axes 18 and 26 are relatively angled by Z/2 to the opposite directions. In this condition the bisector plane P wherein the balls 28 are disposed is in the same location. FIG. 9 shows diagrammatically the condition of the joint when the axis 18 is angled through an angle Z with the axis 26 stationary. In this condition the center point of curvature Oi of the spherical inner surface 10 moves to a point O'i lying on a line 40 which is angled through Z/2 about the center of point of curvature Oo. Then the axis 18 is angled through Z/2 about the point O'i in the same direction. It will be understood that the intersection between the axis 26, the axis 18' and the common plane P' bisecting an angle between the point Oo and O'i is now a new center point of joint O' when the angle is Z. The length of displacement Δ from the point O to O' can be expressed as follows.

$$\Delta = a \left(\text{Sec}\left(\frac{Z}{2}\right) - 1\right)$$

Figure 10:
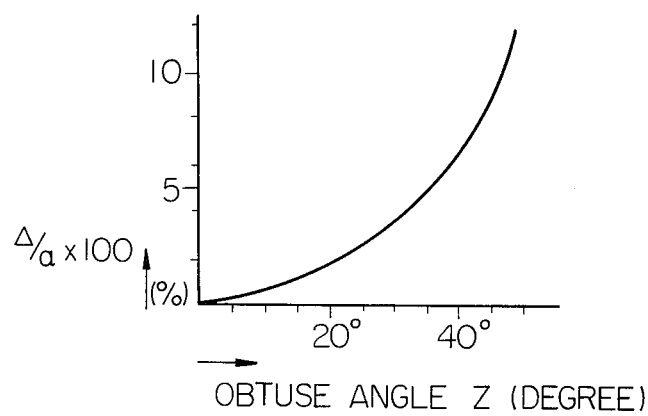
FIG. 10 is a graph showing the relationship between the angle of angular movement and displacement of the center point of the joint.

It is now understood that in the joint of the present invention the center point of the joint moves as the obtuse angle varies. If Δ is long vibration would result when torque is transmitted through the joint. FIG. 10 shows the relation between the obtuse angle Z and the displacement length Δ. When the joint of the present invention is to be used in a power transmitting line of an automobile, the vibration level is acceptable if Δ is shorter than 0.2 mm. Thus if the maximum obtuse angle is to be 45° the value of $a$ should be shorter than 2.5 mm, this being determined from the graph of FIG. 10. This arrangement of the cage contributes to precise ball location in the constant velocity joint with assist of three dimensional location.

Figure 11:
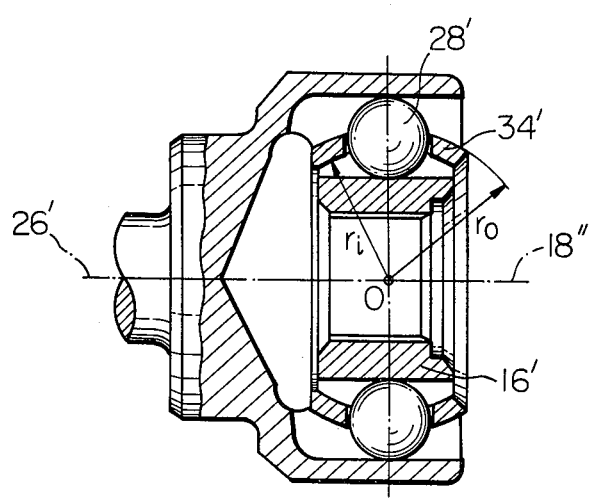
FIG. 11 is a similar view to FIG. 1 showing a prior constant velocity universal joint.

Since the cage 34 has on the edge adjacent to the shaft 26 a greater thickness than on the edge remote from the shaft, it has a greater radial rigidity as compared to a cage 34' used in a prior art universal joint illustrated in FIG. 11.

In case that a relatively wider, in axial length, inner race is to be mounted to obtain a joint having a higher degree of obtuse angle, two diametrically opposed notches 42 are formed in the edge of the cage 34 which has a greater thickness (see FIG. 2) so that the inner race 10 can enter the cage 34 in the manner as shown in FIGS. 3 to 6. Since in the cage 34 of the present invention the cage has a greater thickness on the edge where the notches 42 are to be formed, therefore rigidity of the cage 34 is increased and capable of accepting a wider inner race, as compared to the prior art cage 34' of the joint of FIG. 11. Thus it will now be appreciated that the present invention provides for rigidity of a cage and a joint having a higher degree of angular movement.

From the above description of the present invention it will be understood that in the constant velocity universal joint;

1. theoretically it can transmit power from a driver to a follower through a variable angular movement;

2. practically also it can transmit power between the follower and the driver through a variable degree of obtuse angle because the power transmitting balls are held in a common plane bisecting an angle formed by the axes of the driver and follower;

3. spiral angle of ball retaining grooves may be less than 10° without affecting the ball locating performance of the joint;

4. vibration level is acceptable if $a$ is less than 2.5 mm when the joint is to be used in a power transmitting line of an automobile;

5. the rigidity of the cage is superior to the prior art; and 6. a relatively wide, in axial length, inner race can be mounted in the cage, and thus the joint of the invention has a relatively higher degree of angular movement than those of prior art joints.

What is claimed is:

1. A constant velocity universal joint comprising an inner race and an outer race between which balls are mounted in grooves for transmitting torque therebetween, a ball retaining cage positioned between said inner and outer races retaining said balls in a common plane, said cage having an outer surface formed with a part-spherical surface, the centers of radius of curvature of said part-spherical surfaces being equidistant from and on the opposite sides of the joint center, the inner surface of said cage and the outer surface thereof being in sliding engagement with the outer surface of said inner race and the inner surface of said outer race, respectively, the outer surface of said inner race being formed with a part-spherical surface having substantially the same center of radius of curvature to that of the part-spherical surface forming the inner surface of said cage and the inner surface of said outer race being formed with a part-spherical surface having substantially the same center of radius of curvature to that of the part-spherical surface forming the outer surface of said cage, said inner race being provided in the part-spherical surface thereof with ball-engaging grooves which are angled with respect to the inner race axis and said outer race being provided in the part-spherical surface thereof with ball-engaging grooves which are angled with respect to the outer race axis in the opposite direction.

2. A constant velocity universal joint as claimed in claim 1, wherein said cage has a greater thickness on the edge which is formed with diametrically opposed notches, said inner race being assembled in said cage by inserting said inner race axially into said cage through an opening defined by said notches.

3. A constant velocity universal joint as claimed in claim 1, wherein each of the grooves of said outer race extends along a center line which is inclined with respect to a hypothetical plane including the outer race axis and each of the grooves of said inner race extends along a center line which is inclined with respect to a hypothetical plane including the inner race axis.

* * * * *